E. W. MOCH.
PLUME TRIMMING DEVICE.
APPLICATION FILED JUNE 1, 1911.
1,009,920.
Patented Nov. 28, 1911.
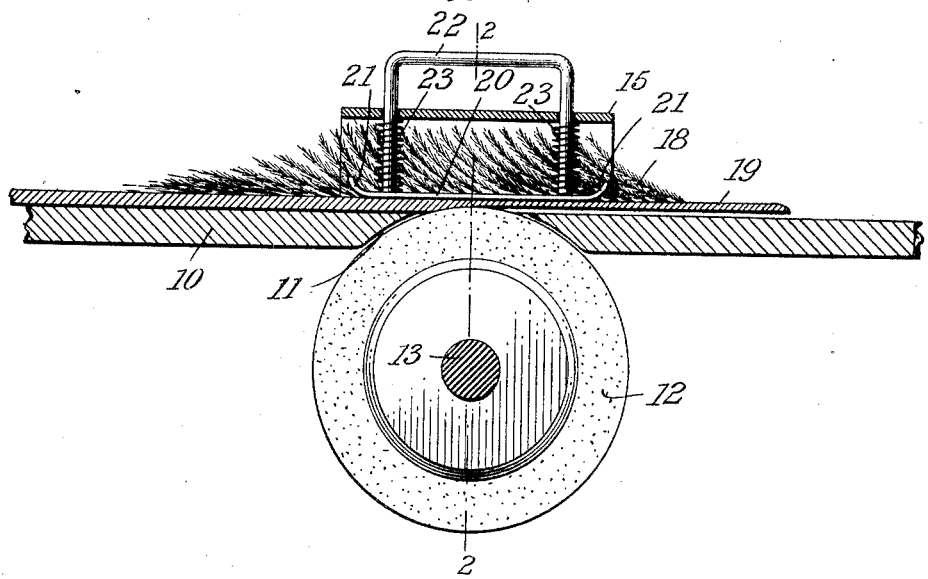
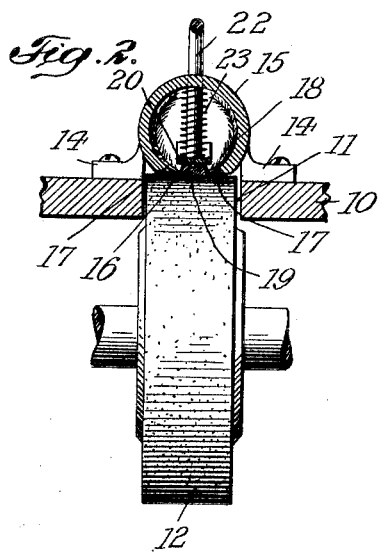
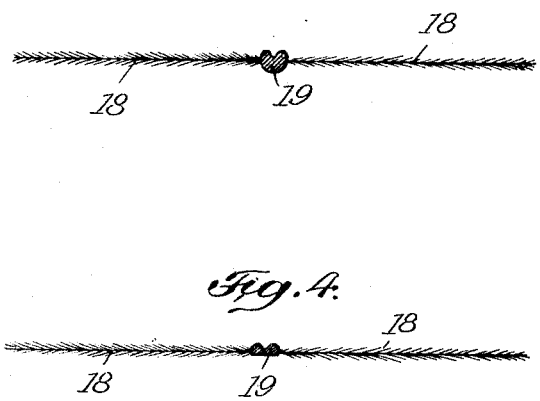
Witnesses:
Inventor
Eugene W. Moch
By his Attorneys

UNITED STATES PATENT OFFICE.

EUGENE W. MOCH, OF NEW YORK, N. Y.

PLUME-TRIMMING DEVICE.

1,009,920.   Specification of Letters Patent.   Patented Nov. 28, 1911.

Application filed June 1, 1911. Serial No. 630,723.

*To all whom it may concern:*

Be it known that I, EUGENE W. MOCH, a citizen of the United States, residing at New York city, county and State of New York, have invented a new and Improved Plume-Trimming Device, of which the following is a specification.

This invention relates to a novel device for reducing the thickness of the stems of ostrich and other plumes or feathers, without injuring the flues or barbs. This trimming of the stems is necessary whenever a plurality of plumes are to be superposed in the manufacture of compound feathers intended to present a rich and full appearance.

The invention comprises novel means for accurately trimming the stem, and for simultaneously protecting the flues against contact with the trimmer, all as hereinafter more fully pointed out.

In the accompanying drawing: Figure 1 is a longitudinal section of a plume-trimming device, embodying my invention; Fig. 2 is a cross section on line 2—2, Fig. 1; Fig. 3 is a cross section through an untrimmed plume, and Fig. 4 a similar section through a trimmed plume.

The work table or plate 10 is provided with an opening 11 through which projects a suitable trimming tool 12. This tool is shown to comprise an abrasive wheel carried by a rotating shaft 13 and extending a slight distance above the surface of table 10. It is obvious however that the trimming tool may be differently constituted, the point being that it is adapted to reduce the thickness of the stem by a grinding, cutting or similar action.

Upon table 10 is secured by brackets 14 or otherwise a horizontal and open-ended casing or guide 15 arranged above trimming tool 12 and made preferably in the form of a tube. From the bottom of this tube is removed along its entire length a segmental section so that the tube is provided with a flat base and an intervening longitudinal slot 16. This base in conjunction with the inner perimeter of casing 15 forms a pair of parallel wedge-shaped edges 17 on opposite sides of slot 16 that flank the operative portion of the trimming tool, said edges constituting upwardly sloping guides or supports for the barbs 18 of the plume to be trimmed, while the plume stem 19 projects with its front or crown through slot 16 into contact with trimming tool 12. The correlation of the parts is such that the base of casing 15 is arranged in close proximity to the working face of the trimming tool, so that the stem may be trimmed off close to the roots of the barbs.

Within casing 15 is located a presser foot 20, extending longitudinally therethrough and having upturned rounded ends 21 adapted to permit the ready passage therebeneath of the feather. Presser foot 20 is provided with a bail-shaped handle 22 extending upwardly through corresponding apertures of the casing and carrying springs 23, that tend to lower the foot upon the work.

In use the plume to be trimmed is introduced into casing 15 and drawn manually through the same, while the trimmer is in action. During this operation, the presser foot will bear on the stem 19 to project its crown through slot 16 into contact with grinding tool 12, while the wedge-shaped edges 17 by engaging the roots of barbs 18 limit the extent to which stem 19 is projected below the casing. Thus while the feather is drawn through the casing, the front of the stem is ground off to an extent limited by the roots of barbs 18, and at the same time such front is flattened (Fig. 4) to permit the juxtaposition of a plurality of trimmed plumes for the production of a compact compound plume. It will further be seen that during the operation of the device, the barbs 18 will be deflected upward by tapering edges 17 so as to be withdrawn from any injurious contact with the trimming tool.

I claim:

1. A device of the character described, comprising a table, a trimming tool projecting above the same, a slotted tubular guide mounted on the table above the tool, a presser foot having upwardly flaring ends and arranged within the guide, and a bail-shaped handle on the presser foot that extends upwardly through said guide.

2. A device of the character described, comprising an apertured table, a rotatable grinding tool projecting partly therethrough, and a slotted tubular guide mounted on the table above said tool.

3. A device of the character described, comprising an apertured table, a rotatable grinding tool projecting partly therethrough, a slotted tubular guide mounted on the table above said tool, and a presser foot within the guide.

4. A device of the character described, comprising means for trimming a plume-stem, a curved slotted guide for deflecting the flues away from the trimming means, and means for sustaining said guide above the trimming means.

5. A device of the character described, comprising an apertured table, a plume-stem trimmer projecting partly therethrough, and a curved slotted guide mounted on the table and adapted to be interposed between the trimmer and the plume-barbs.

EUGENE W. MOCH.

Witnesses:
FRANK V. BRIESEN,
KATHERYNE KOCH.

Copies of this patent may be obtained for five cents each, by addressing the "Commissioner of Patents, Washington, D. C."